T. ALLEN.
Seed-Planter.
No. 69,301.  Patented Oct 1, 1867.
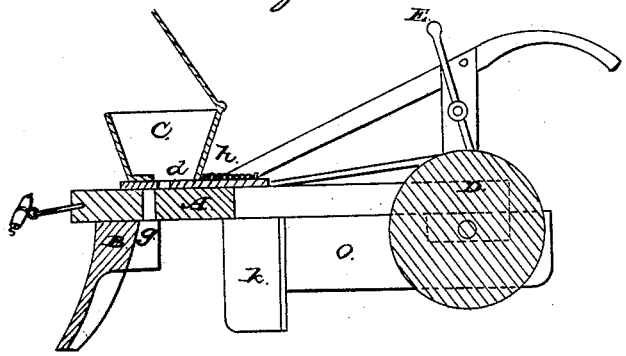
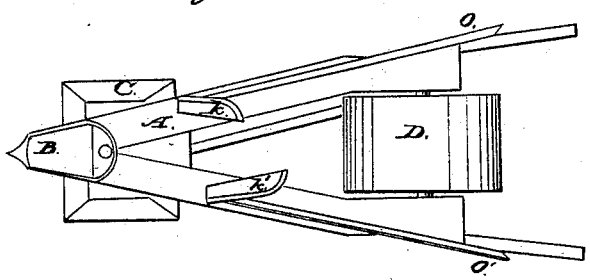
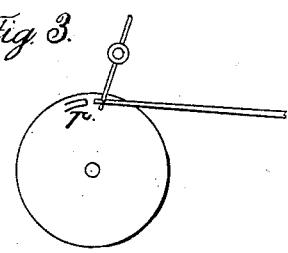
Witnesses.  Inventor:
Sam'l S. Boyd.  Thomas his × mark Allen
Henry T. Carter.

United States Patent Office.

THOMAS ALLEN, OF ARROW ROCK, MISSOURI, ASSIGNOR TO HIMSELF, JOSEPH NICHOLSON, OF ARROW ROCK, AND A. B. GARRISON, OF ST. LOUIS, MISSOURI.

*Letters Patent No. 69,301, dated October 1, 1867.*

IMPROVEMENT IN CORN-PLANTERS.

*The Schedule referred to in these Letters Patent and making part of the same.*

TO ALL WHOM IT MAY CONCERN:

Be it known that I, THOMAS ALLEN, of Arrow Rock, Saline county, Missouri, have invented a new and useful improved Corn-Planter, of which the following is a full, clear, and exact description, reference being had to the annexed drawing, making a part of this specification, in which—

Figure 1 represents a longitudinal sectional elevation of my invention.

Figure 2 represents a bottom view of same.

Figure 3 represents a reversed side view of the roller, showing the adjustable cam attached thereto.

Figure 4 represents a section of the corn-hill as formed by my planter.

Similar letters indicate like parts.

My invention consists of a triangular frame, A, (figs. 1 and 2,) made of oak or other substantial material, having at its vertex, on the under side, a furrow-plough, B, (figs. 1 and 2,) and above this the hopper C (figs. 1 and 2.) As the furrow-plough opens the earth, a slide-valve, $d$, (fig. 1,) is, by means of a lever, E, (fig. 1,) thrown forward with its charge of corn, until it empties itself through the funnel $g$, fig. 1, it being a part of the furrow-plough, into the furrow made for its reception. Then the valve is brought back to its original position by means of the lever. The corn being deposited, the "coverers" $k$ (fig. 1) and $k$ and $k'$ (fig. 2) then throw the loose earth over it. These "coverers" being arranged, the one a little in advance of the other, make the hills much more regular and uniform, since as the forward one, first striking the earth, throws it to one side, the rear one then catches it and arranges it properly, while the roller D, following, completes the hill by flattening it, as shown at $m$, fig. 4. The side boards O, fig. 1, and O and O', fig. 2, prevent the clods from falling in the rear of the "coverers" and deranging the hills. Adjustable cams or pins $p$, fig. 3, are attached to the roller in such a manner as, with the spring $h$, fig. 1, to give the desired reciprocatory motion to the slide-valve, which will then work automatically.

The advantage of having the valve work either automatically or by a lever consists in this: When the planter is used on rough ground, where it is not desirable to drop the seed regularly, the cams or pins may be removed, and then, by the lever, the dropping of the seed is entirely under the control of the operator.

The other advantages of my planter consist in the peculiar arrangement of the "coverers," combined with the side boards and roller, thus producing a better formed hill, and in its cheapness and simplicity of construction and ease of operation.

I do not claim to be the first inventor of the use of a furrow-plough, or a slide-valve working automatically or with a lever, nor of a coverer of a corn-planter.

What I do claim as my invention, and desire to secure by Letters Patent, is—

The arrangement of the furrow-plough B, coverers $k$ $k'$, side boards O O', rolling-wheel D, slide-valve $d$, worked with a lever, E, or automatically, the adjustable cams or pins $p$ on the rolling-wheel, all in combination, when constructed and arranged substantially as shown and specified.

THOMAS $\times$ ALLEN.
his mark.

Witnesses:
AUSTIN JONES,
JOSEPH NICHOLSON.